United States Patent [19]

Kataoka et al.

[11] Patent Number: 5,021,212
[45] Date of Patent: Jun. 4, 1991

[54] PRIMARY CONTAINMENT VESSEL WITH OUTER POOL

[75] Inventors: Yoshiyuki Kataoka; Isao Sumida, both of Ibaraki; Masataka Hidaka; Masanori Naitoh, both of Hitachi, all of Japan

[73] Assignee: Hitachi, Ltd., Tokyo, Japan

[21] Appl. No.: 522,033

[22] Filed: May 11, 1990

[30] Foreign Application Priority Data

May 11, 1989 [JP] Japan .................................. 1-118369

[51] Int. Cl.$^5$ ............................................. G21C 15/18
[52] U.S. Cl. ..................................... 376/283; 376/299
[58] Field of Search ............... 376/282, 283, 293, 298, 376/299

[56] References Cited

U.S. PATENT DOCUMENTS 4,022,655  5/1977  Gaouditz et al. .................... 376/283

FOREIGN PATENT DOCUMENTS

| 31837 | 7/1986 | Japan | 376/283 |
| 33697 | 2/1988 | Japan | 376/283 |
| 75594 | 4/1988 | Japan | 376/283 |
| 229390 | 9/1988 | Japan | 376/283 |
| 67993 | 3/1990 | Japan | 376/283 |
| 96689 | 4/1990 | Japan | 376/283 |

Primary Examiner—Daniel D. Wasil
Attorney, Agent, or Firm—Antonelli, Terry, Stout & Kraus

[57] ABSTRACT

A primary containment vessel, comprising a reactor pressure vessel in which a core is accommodated, a dry-well volume covering the upper portion of the reactor pressure vessel, a suppression chamber provided with a suppression pool surrounding an intermediate portion of the reactor pressure vessel, has a plurality of vent tubes establishing a connection between the dry-well volume and the suppression pool and an annular baffle plate disposed in the suppression pool along the side wall of the suppression chamber, having its top end positioned at a height between a free surface of the suppression pool and an outlet of the vent tube opened in the suppression pool and its lower end positioned at a height between the outlet and the bottom of the suppression pool. If a loss of coolant accident occurs, hot steam discharged into the dry-well volume is discharged into the suppression pool through the vent tube so as to heat water on the inside of the baffle plate. The water head difference generated by the water temperature difference between the inside and the outside portions of the baffle plate causes a vertical convection passing through the baffle plate to be created. Therefore, the heat accumulating characteristics of pool water and the heat radiation performance of the containment vessel are improved, allowing the size of the containment vessel to be reduced.

10 Claims, 6 Drawing Sheets

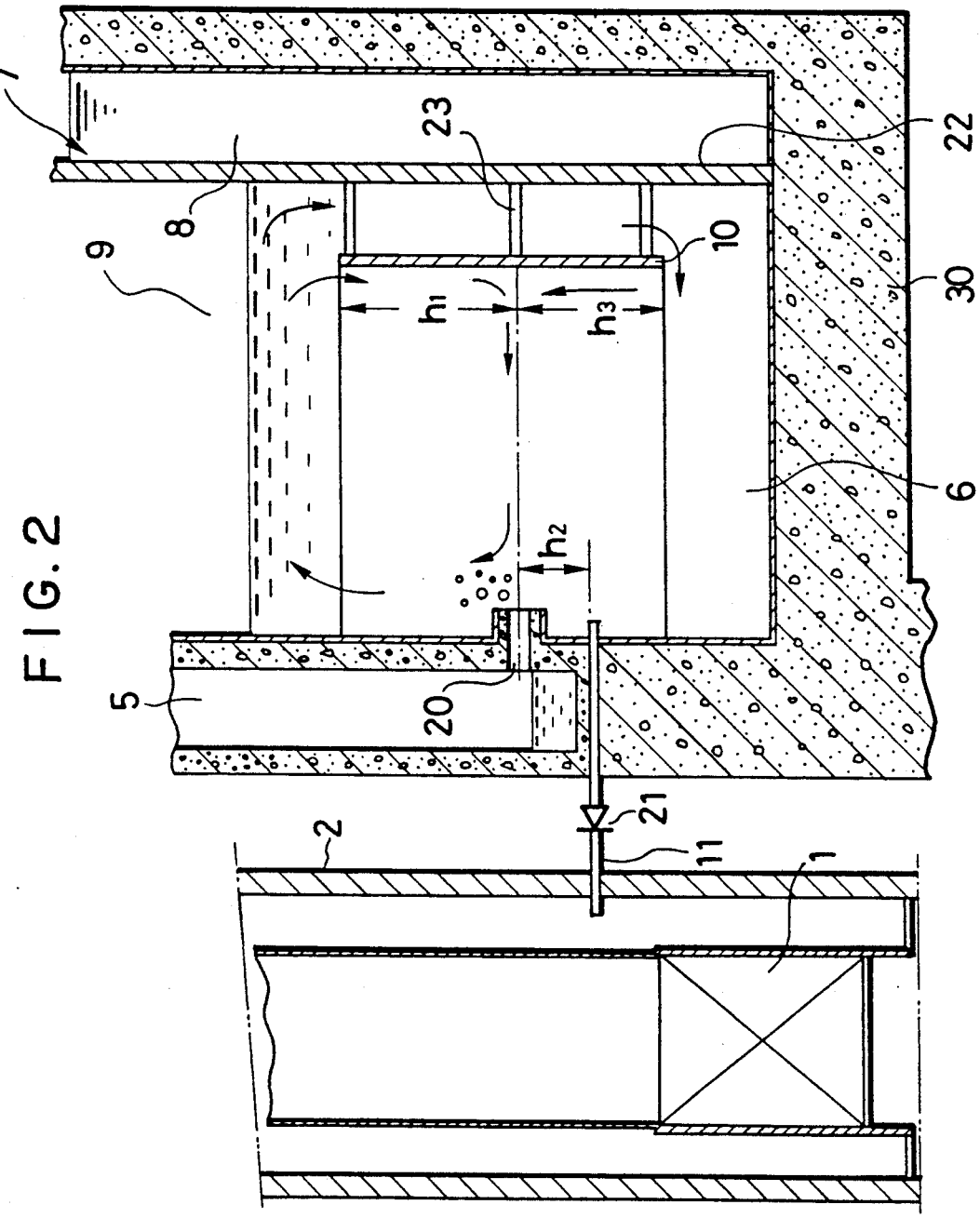

FIG. 4A
FIG. 4B
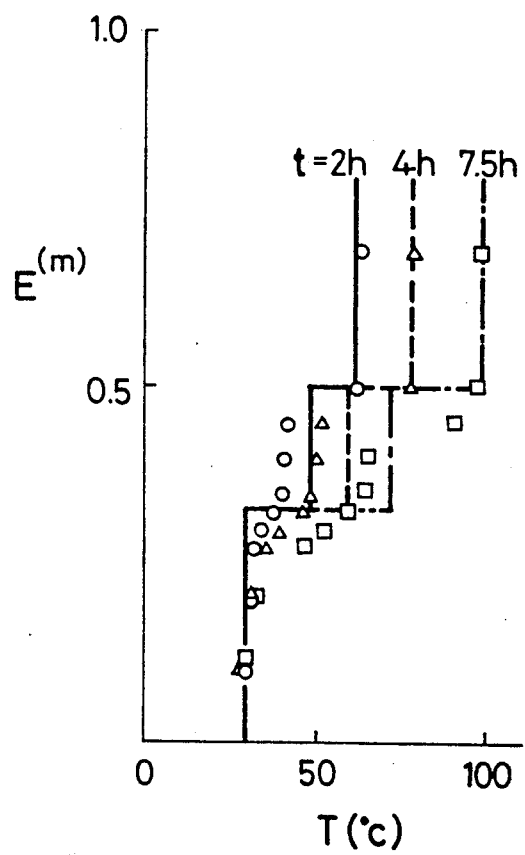
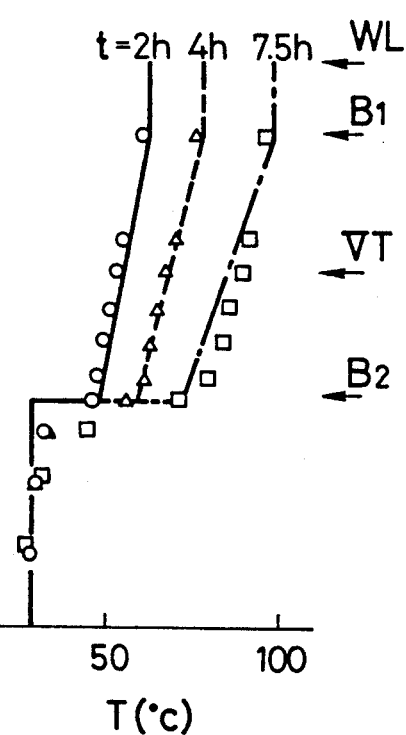

PRIMARY CONTAINMENT VESSEL WITH OUTER POOL

BACKGROUND OF THE INVENTION

1. Field of the Invention

The present invention relates to a primary containment vessel of a boiling water type reactor, and, more particularly, to a primary containment vessel structured in such a manner that the performance of cooling the containment vessel can be improved at the time of a loss of coolant accident without a necessity of using a dynamic device such as a pump.

2. Description of the Prior Art

A primary containment vessel is arranged to hermetically surround a reactor pressure vessel which accommodates a core. An upper space surrounding the reactor pressure vessel in the primary containment vessel is called "a dry-well volume", while a space disposed in the lower portion of the primary containment vessel and filled with pool water is called "a suppression chamber". An outer pool filled with cooling water is formed around the suppression chamber of the primary containment vessel. The dry-well volume and the suppression chamber are connected to each other by a plurality of vent tubes, an end portion of the vent tube being opened in water enclosed in the suppression pool. A main steam line through which steam generated in the reactor pressure vessel passes and pipes into which coolant is introduced are disposed in the dry-well volume.

If the main steam line is burst in the primary containment vessel or the reactor pressure vessel is locally damaged, high temperature and high pressure cooling water becomes high temperature and high pressure steam and jets out in the dry-well volume. This is so-called a loss of coolant accident. The steam jetted out in the dry-well volume is introduced together with non-condensing gas (called hereinafter as gas) in the dry-well volume into water in the suppression pool via the vent tube, water being then cooled and condensed in the suppression pool, causing the pressure rise in the dry-well volume to be suppressed.

A primary containment vessel of the type described above has been disclosed in Japanese Patent Laid-Open No. 75594/1988. According to this disclosure, it is necessary for the convection of water in the pressure suppression pool to be induced and it is necessary for the outward heat transfer from the pressure suppression pool to be improved in order to have the primary containment vessel cooled effectively at the time of a loss of coolant accident. Therefore, the opening of the vent tube is disposed adjacently to the bottom of the suppression pool so as to cause water in the suppression pool to be convected by utilizing the buoyancy of heated water or gas in the suppression pool. However, a structure arranged such that the opening of the vent tube is, as described above, disposed deeply in the suppression pool encounters a problem in that a fear arises in that the water or gas in the suppression pool hits the ceiling of the suppression chamber since energy of the buoyancy of water or gas in the suppression pool becomes too large. Therefore, the suppression chamber must have a high ceiling, causing also the height of the primary containment vessel to be increased. As a result, the size of it inevitably become large.

If the vent tube outlet is disposed in the shallow water in the suppression pool, water close to the water surface convects since it is stirred. However, since deep water in the suppression pool is not stirred, it is difficult for the convection to occur. Therefore, water in the suppression pool below the bent tube outlet remains as it is with the initial temperature maintained, and a slight quantity water above the vent tube outlet becomes heated. Therefore, it is necessary for the diameter of the primary containment vessel to be enlarged in order to provide the heat transferring area necessary to remove the heating value at the time of the loss of coolant accident.

A suppression pool of a primary containment vessel disclosed in Japanese Patent Laid-Open No. 31837/1986 is arranged in such a manner that a distributing vane is locally provided for each of a plurality of the vent tube outlets in front thereof to disperse steam and gas jetted radially from the vent tube outlets in the circumferential direction so that the dynamic load to act on the primary containment vessel is reduced. However, this structure involves a problem in that it is difficult for water in the suppression pool to convect vertically.

A primary containment vessel has been disclosed in Japanese Patent Laid-Open No. 229390/1988 in which the core is immersed in water by utilizing the difference in the water heads from the water surface of water in the suppression pool to the core equalizing line at the time of a loss of coolant accident. According to this example, since water in the suppression pool cannot be easily convected and only upper hot water in the suppression pool is injected into the core, the cooling effect is unsatisfactory. Furthermore, since the high temperature water in the suppression pool cannot be easily transferred, the heat transference effect from the suppression chamber to the surrounding pool is insufficient.

A primary containment vessel has been disclosed in Japanese Patent Laid-Open No. 33697/1988 in which an annular suppression pool is disposed in the side portion to the upper portion of the dry-well volume and an annular clean water pool is closely disposed above the suppression pool via an insulating wall. Since the above-described two pools are connected to each other by a heat pipe, the heating value radiated into the clean water pool at the time of a loss of coolant accident can be transmitted to the clean water pool via the heat pipe and it is removed. However, since only the heat pipe is immersed in the upper portion of water in the suppression pool, the heat transferring effect by means of the heat pipe can be excessively deteriorated when water in the suppression pool is injected into the reactor pressure vessel at the time of the loss of coolant accident and level of the suppression pool is thereby lowered.

SUMMARY OF THE INVENTION

An object of the present invention is to improve a heat-radiation effect of a primary containment vessel without using a dynamic equipment such as a pump and without a necessity of enlarging the size of the primary containment vessel.

In order to achieve the above-described object, a first aspect of the present invention lies in a primary containment vessel comprising: a dry-well volume accommodating a reactor pressure vessel in which a core is accommodated and covering the upper portion of the reactor pressure vessel; an annular suppression chamber provided with a suppression pool surrounding an intermediate portion of the reactor pressure vessel and filled with cooling water, the water surface of which is positioned higher than the top end of the core; a plurality of vent tubes establishing a connection between the dry-well volume and the suppression pool; a steel containment vessel forming an annular outer wall of the reactor pressure vessel and hermetically surrounding the dry-well volume: an outer pool surrounding the outer wall of the containment vessel and filled with cooling water; and a baffle plate disposed in the suppression pool along the outer wall of the containment vessel, having its top end positioned at a height between a free surface of the suppression pool and an outlet of the vent tube opened in the suppression pool and its lower end positioned at a height between the outlet and the bottom of the suppression pool, wherein a natural pool water convection passage circulating from the inside of the baffle plate to the outside of the same is formed.

According to the above-described primary containment vessel, if an accident occurs in which cooling water heated at the core jets out into the dry-well volume in the form of high temperature steam, the steam and gas in the dry-well volume can be discharged into the suppression pool via a plurality of vent tubes. As a result of the radiation of high temperature steam, water in the suppression pool adjacent to the outlet of the vent tube is heated in the inside portion of the baffle plate and the density of it thereby is made smaller than that of water in the outside portion of the same. Therefore, a water head difference of pool water is generated between the inside portion and the outside portion, causing the water head of pool water on the outside of the baffle plate to be raised. The thus generated water head difference causes pool water to convect from the outside portion of the baffle plate to the inside portion of the same via the lower end of the baffle plate. Since the lower end of the baffle plate is positioned lower than the outlet of the vent tube, the range of the convection extends to a portion lower than the outlet so that the range of contact between heated pool water and the outer wall of the primary containment vessel is vertically enlarged. By virtue of the thus created water convention, the high temperature region of pool water can be enlarged with respect to the conventional structure in which the high temperature region has been limited to the water depth corresponding to the outlet. Therefore, heat generated due to the accident and accumulated in water of the suppression pool can be transferred to pool water in the outer pool via the vertically wide wall of the primary containment vessel. Therefore, the primary containment vessel can be efficiently cooled.

According to the above-described primary containment vessel, when the baffle plate is disposed such that a relationship $h_1 > h_3$ is satisfied where the difference in height between the top end of the baffle plate and the outlet is $h_1$ and the difference in height between the outlet and the lower end of the baffle plate is $h_3$, an effect of assuredly having pool water outside the baffle plate made a downward flow can be obtained. Therefore, the convection circulating from the outside portion of the baffle plate to the inside portion of the same via the lower end of the same can be assuredly created. Furthermore, when the structure of the primary containment vessel is arranged such that a relationship $h_3 = 0.75\ h_1$ can be held, both the heat accumulating characteristics and the heat radiation characteristics of pool water can be improved. Therefore, heat discharged into the dry-well volume can be effectively absorbed into the suppression chamber and it can be effectively discharged to the outer pool.

The baffle plate disposed in the suppression pool of the primary containment vessel is secured to a plurality of supports fastened to the outer wall of the containment vessel. When it is formed annularly along the outer wall of the containment vessel, it can serve as a member for reinforcing the baffle plate although an impact due to steam or gas discharged from the outlet of the vent tube acts on the baffle plate. Therefore, the soundness of the baffle plate can be maintained even if its thickness is reduced.

A second aspect of the present invention lies in a primary containment vessel according to the first aspect, wherein an equalizing line is provided, the equalizing line establishing a connection between the suppression pool and the reactor pressure vessel via a check valve thereof for stopping a flow into the suppression pool, the equalizing line having its opening in the suppression pool at a position lower than the outlet and its opening in the reactor pressure vessel at a position upper than the core. According to the above-described structure, a further effect can be obtained in addition to the effect obtained according to the first aspect of the present invention, the effect being that, the exposure of the core over the surface of cooling water in the reactor pressure vessel can be prevented and decay heat of the core can be assuredly removed. The reason for this lines in that, when the pressure in the reactor pressure vessel is lowered and becomes substantially the same level as that in the containment vessel, suppression pool water having relatively lower temperature and positioned lower than the outlet is injected into the reactor pressure vessel via the equalizing line due to the water head difference.

A third aspect of the present invention lies in a primary containment vessel according to the first aspect, wherein the baffle plate has a vertical cross sectional shape formed in such a manner that it is positioned close to the outer wall of the containment vessel in a portion upper than the outlet and it is positioned close to the outlet in a portion lower than the outlet. According to the above-described structure, another effect can be obtained in addition to the effect obtained according to the first aspect of the present invention, the effect being that pool water between the baffle plate and the bottom of the suppression pool can be assuredly convected in the direction toward the outlet so that heat discharged through the outlet can be received. Furthermore, hot water on the inside of the baffle plate can be moved by the convection so that pool water between the baffle plate and the bottom of the suppression pool can also be utilized for heat accumulation. Therefore, the heat accumulating capacity of pool water can be enlarged.

Other and further objects, features and advantages of the invention will be appear more fully from the following description.

BRIEF DESCRIPTION OF THE DRAWINGS

FIG. 2 is a detailed vertical cross sectional view which illustrates a portion around a suppression chamber of the primary containment vessel according to the first embodiment of the present invention;

FIGS. 4A and 4B are graphs which illustrate a result of a comparison made between the experimental result and the analytical result of the model shown in FIGS. 3A and 3B:

DESCRIPTION OF PREFERRED EMBODIMENTS

Figure 1:
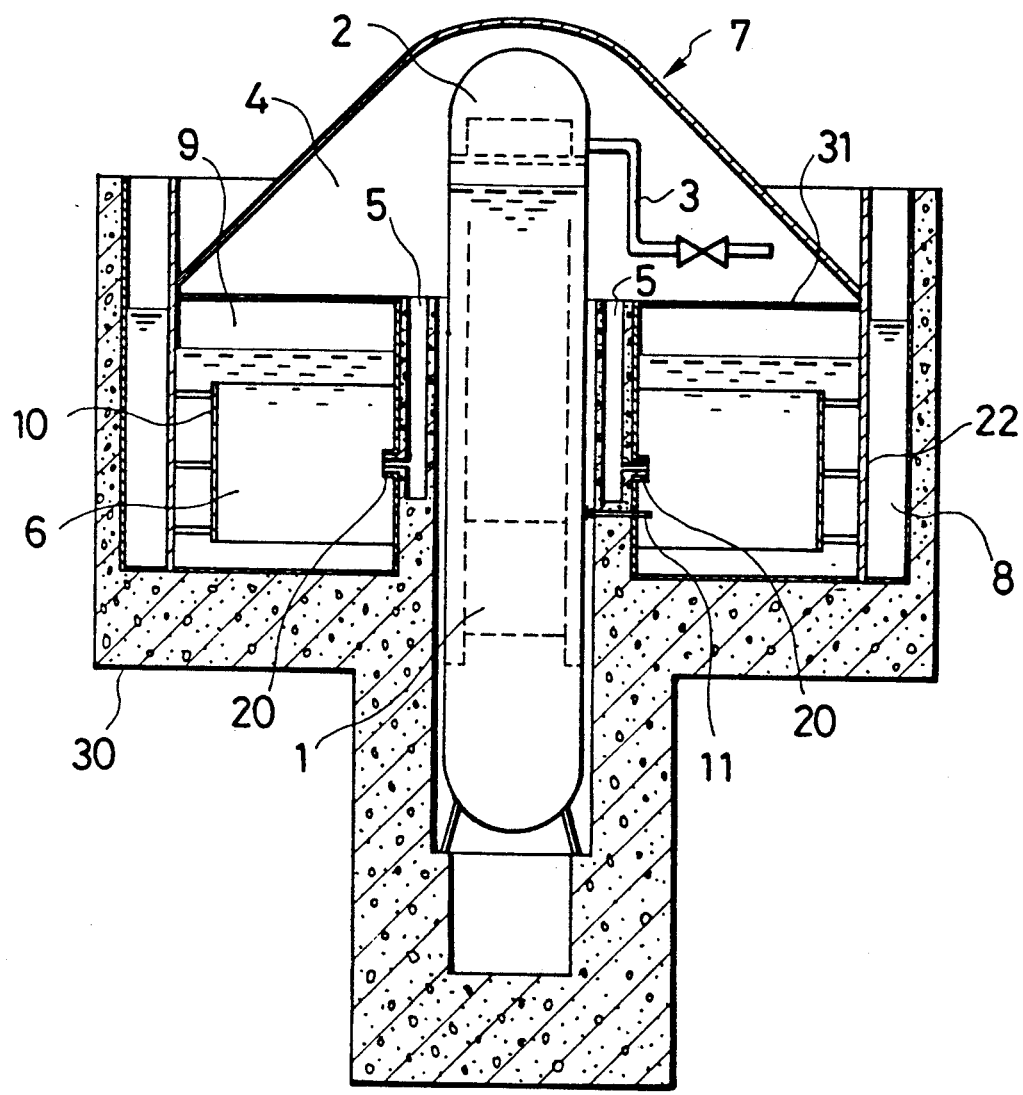
FIG. 1 is a vertical cross sectional view which illustrates a primary containment vessel with outer pool according to a first embodiment of the present invention.

Referring to FIG. 1, cooling water is circulated in a reactor pressure vessel 2. In the reactor pressure vessel 2, there is provided a core 1 of a nuclear reactor. A main stream line 3 is connected to the upper portion of the reactor pressure vessel 2.

Cooling water in the reactor pressure vessel 2 is heated and is thereby converted into high temperature and high pressure steam, steam thus generating being then discharged outside the reactor pressure vessel 2 via the main stream line 3. Steam thus discharged outside the reactor pressure vessel 2 is utilized as a power source for a turbine generator similar to ordinary nuclear power plants. Steam which has been utilized is condensed and is returned, as cooling water, into the reactor pressure vessel 2.

A primary containment vessel 7 is a steel structure erecting on a base met 30, the primary containment vessel 7 being sectioned into a dry-well volume 4 and a suppression chamber 31. The dry-well volume 4 accommodates the reactor pressure vessel 2, and the suppression chamber 31 is formed to surround the reactor pressure vessel 2.

The suppression chamber 31 containing cooling water as pool water, comprises a suppression pool 6 in liquid phase and a wet-well volume 9 in gaseous phase.

The dry-well volume 4 and the suppression pool 6 are connected to each other by a plurality of vent tubes 5. An outlet 20 of the vent tube 5 is arranged to open horizontally at a position higher than a top of the core 1 of the reactor.

A baffle plate 10 is disposed in the suppression pool 6 along the inner surface of the primary containment vessel 7. The baffle plate 10 is supported in such a manner that the baffle plate 10 is fastened to supports 23 secured to the wall of the primary containment vessel 7 and it does not partition between the water surface of the suppression pool 6 and the top end of the baffle plate 10 and between the bottom of the suppression pool 6 and the lower end of the baffle plate 10. It is arranged such that the distance from the top end of the baffle plate 10 to the water surface of the suppression pool 6 and the distance from the lower end of the baffle plate 10 to the bottom of the suppression pool 6 are substantially equal and is larger than the distance from the baffle plate 10 to a wall 22 of the primary containment vessel 7. As shown in FIG. 2, the baffle plate 10 is disposed in the suppression pool 6 in such a manner that the height $h_1$ of the top end of the baffle plate 10 from a reference position, which is the height of the outlet 20 of the vent tube 5, and the depth $h_3$ of the lower end of the baffle plate holds the relationship $h_1 > h_3$. Namely, the outlet 20 of the vent tube 5 is positioned lower than the middle point of the height of the baffle plate 10, that is, it is positioned lower than the middle point of the depth of water in the suppression pool 6.

On the other hand, a core equalizing line 11 establishes a connection between a portion of the suppression pool 6 lower than the outlet 20 of the bent tube 5 by $h_2$ and a portion of the reactor pressure vessel 2 upper than the top end of the core 1, the connection being established via a check-valve 21. The check-valve 21 prevents the cooling water in the reactor pressure vessel 2, which becomes high pressure at a normal operation, from flowing backward into the suppression pool 6.

An outer pool 8 is formed around a suppression chamber 31 of the primary containment vessel 7. The outer pool 8 is filled with cooling water. Cooling water in the outer pool 8 surrounds the suppression chamber 31 and is in contact with the wall 22 of the primary containment vessel 7. The outer pool 8 has a gaseous-phase portion in the upper portion thereof, the gaseous-phase portion being opened in another space in order to cause water in the outer pool 8 to be easily evaporated.

If a loss of coolant accident represented by a breakage of the main steam line 3 happens, high temperature steam in the reactor pressure vessel 2 continuously flows out through the broken portion of the main steam line 3 by decay heat of the core 1. Simultaneously, the level of cooling water in the reactor pressure vessel 2 is lowered. Hot steam flowed out into the dry-well volume 4 passes through the vent tube 5 together with noncondensing gas in the dry-well volume 4 so as to be discharged into the suppression pool 6 through the outlet 20. In the beginning of the accident, the discharging pressure is high and the quantity of the noncondensing gas discharged together with steam into the suppression pool is large. Therefore, the water surface of the suppression pool 6 moves vertically considerably since the water surface of the suppression pool 6 stands up or the buoyancy of the bubbles of the noncondensing gas acts or due to an action of the burst of the bubbles expanded during the upward movement of the bubbles at the water surface. Therefore, a large impact load can act on the ceiling of the suppression chamber 31. However, according to this embodiment, since the outlet 20 of the vent tube 5 is disposed at an intermediate depth of water in the suppression pool 6, the movement or standing up of the water surface of the suppression pool 6 can be reduced. Therefore, the ceiling of the suppression chamber 31 can be satisfactorily protected from damage.

High temperature steam discharged into the suppression pool 6 is condensed in water in the suppression pool 6. As a result of this condensation, the temperature of water in a portion of water existing close to the outlet 20 of the vent tube 5 higher than the outlet 20 is raised. On the other hand, the temperature of water between the primary containment vessel 7 and the baffle plate 10 is lower than that of water existing close to the outlet 20 of the vent tube 5 since heat is transferred to water in the outer pool 8 through the wall 22. Therefore, water in the suppression pool 6 is, as designated by an curved arrow of FIG. 2, naturally convected.

Thus, at the time of a loss of coolant accident, heat discharged into the primary containment vessel 7 containing decay heat of the core 1 is accumulated into water in the suppression pool 6.

Since water in the suppression pool 6 convects as designated by the curved arrow of FIG. 2, hot water close to the water surface of the suppression pool 6 is moved downwards between the primary containment vessel 7 and the baffle plate 10. During this downward movement, hot water in the suppression pool 6 is brought into contact with the inner wall 22 of the primary containment vessel 7 so that heat of water in the suppression pool 6 is transferred to water in the outer pool 8. As a result of the heat transference, the temperature of water in the suppression pool 6 which is in contact with the wall of the primary containment vessel 7 is lowered, but is even higher than that in the original stage before the accident. Hot water in the suppression pool 6 is introduced into the inner wall of the primary containment vessel 7 at which it is cooled and is moved downwards below the outlet 20 of the vent tube 5. Therefore, the region in which hot water exists can be widened downwards, the region being limited in a portion higher than the outlet 20 of the vent tube 5 in the conventional structure. Therefore, the heat transfer surface from hot water in the suppression pool 6 to the outer pool 8 can be increased, causing the heat radiation efficiency from the primary containment vessel 7 to be improved.

Water in the outer pool, which has received heat from the primary containment vessel 7, starts evaporation at the evaporating temperature so that heat of vaporization is discharged outside.

After the accident, the internal pressure of the reactor pressure vessel 2 and the pressure at the outlet 20 of the vent tube 5 are gradually made the same. As a result, water in the suppression pool 6 flows into the reactor pressure vessel 2 due to the water head pressure corresponding to the height difference $h_2$ between the outlet 20 of the vent tube 5 and the core equalizing line 11. Therefore, safety of the core 1 in the reactor pressure vessel 2 can be secured since the state in which the core 1 is immersed in cooling water is continued.

Figure 3A:
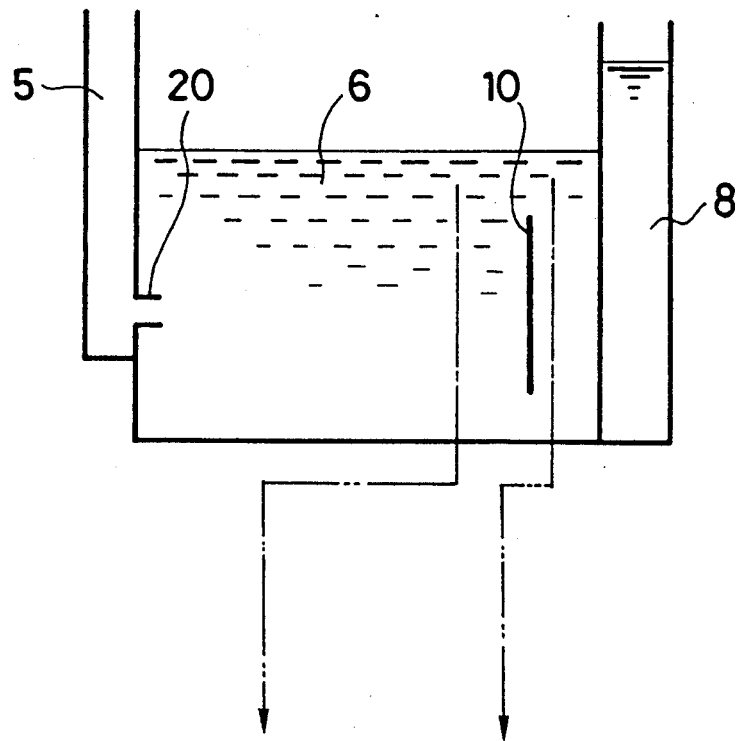
FIGS. 3A and 3B are schematic views which illustrate a temperature distribution model of water in a suppression pool of suppression chamber of the primary containment vessel according to the first embodiment of the present invention, in which model inside a baffle plate and that outside the same are compared.
Figure 3B:
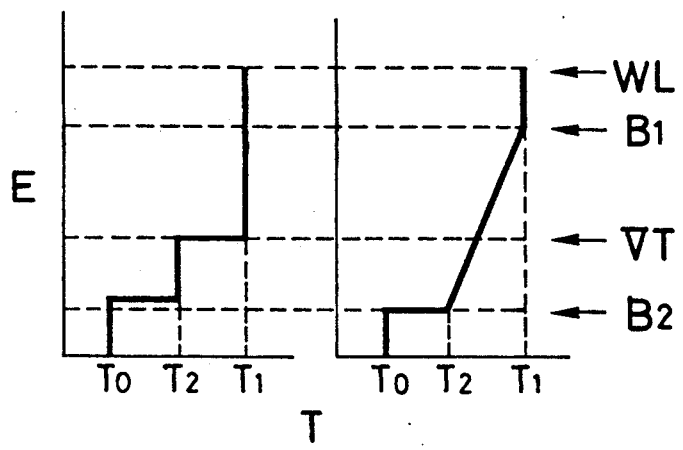

Then, conditions in which the downward flow can be assuredly formed outside the baffle plate 10 immersed in the suppression pool 6 will be considered. FIG. 3B illustrates a temperature distribution on the inside and the outside of the baffle plate 10 in the direction of its height, the temperature distribution being estimated in the case where a downward flow is formed on the outside of the baffle plate 10. Referring to FIG. 3B, symbol E represents the height, T represents the temperature of water in the suppression pool 6, WL represents the water surface, $B_1$ represents the top end of the baffle plate 10, VT represents the outlet 20 of the vent tube 5 and $B_2$ represents the lower end of the baffle plate 10. The temperature of a region inside the baffle plate 10 and upper than the outlet 20 of the vent tube 5 becomes $T_1$ due to a natural circulation caused by heat generated by a condensation taken place in the vicinity of the outlet 20. The temperature of a region outside the baffle plate 10 and upper than the top end of the baffle plate 10 becomes $T_1$ which is the same as that inside the baffle plate 10. The downward flow passing outside the baffle plate 10 is cooled due to the heat transfer to the outer pool 8 so that it becomes $T_2$ at the lower end of the baffle plate 10. Assuming that the heat radiation characteristics to the outer pool 8, that is, the convection heat transfer ratio is constant, the temperature is, as illustrated, lowered linearly between the top end and the lower end of the baffle plate 10. Furthermore, since water of temperature $T_2$ is introduced into the inner region after it has passed through the lower end of the baffle plate 10, the temperature of water in the portion inside the baffle plate 10 and lower than the outlet 20 of the bent tube 5 becomes $T_2$. The temperature $T_2$ is determined by the conditions in which the balance between the inside portion and the outside portion is arranged. However, the temperature of water lower than the lower end of the baffle plate 10 becomes $T_0$ which is the initial temperature.

A result of a comparison made between a temperature distribution model and the experimental result subjected to a 16-degree sector device of 1/10 scale is shown in FIGS. 4A and 4B. FIG. 4A illustrates a temperature distribution of water in the suppression pool 6 in a portion inside the baffle plate 10, while FIG. 4B illustrates a temperature distribution of water in the suppression pool 6 in a portion outside the baffle plate 10. Referring to the drawings, symbol t represents the lapse of time taken from the start of the steam introduction and E, T, WL, $B_1$, VT and $B_2$ represent the same factors as those shown in FIG. 3B. Points of measurement show the measured temperature at each of the heights at 2, 4 and 7.5 hours after the steam introduction from the dummy of the vent tube 5 of the device has been started, while lines show the analytical result with the above-described model. As is shown, the experimental result and the analytical result significantly coincide with each other. Therefore, it is apparent the employed model is a suitable model.

With the above-described model, the conditions in which the downward flow can be formed outside the baffle plate 10, that is a circulation passing through the inside and the outside of the baffle plate 10 will be considered. The conditions are expressed by the following Equation (1):

$$\rho(T_1)h_1 + \rho(T_2)h_3 < \rho\{(T_1+T_2)/2\}(h_1+h_3) \tag{1}$$

where $\rho(T)$ represents the density of water at temperature T, the other symbols represent the heights and temperatures shown in FIGS. 2 and 3B. The above-described condition means a fact that the circulation occurs in only the case where the water head outside the baffle plate 10 is higher than the water head inside the same. The generation of the circulation is limited when $T_2=T_0$. Approximation of the density of water by $\rho(T)=a-bT$ and transformation of Equation (1) to make $T_2=T_0$ gives the following Equation (2):

$$(h_3-h_1)(T_1-T_0)<0 \tag{2}$$

The condition for causing the circulation between the inside and the outside portions of the baffle plate 10 is the relationship $h_3<h_1$, which meets Equation (2), between height of the baffle plate 10 and that of the outlet 20 of the vent tube 5. If the baffle plate 10 is lengthened downwards excessively, no downward flow is generated outside the baffle plate 10. Such a long baffle plate 10 acts as an obstruction since it has not effect.

Figure 5:
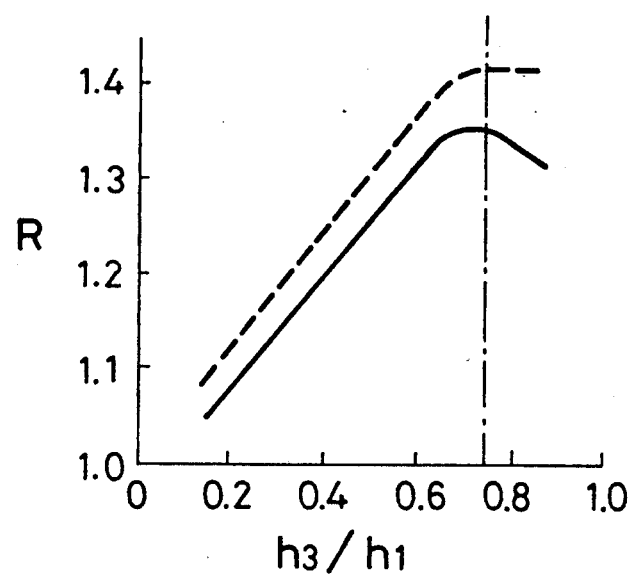
FIG. 5 is a graph which illustrates a change in the heat accumulating characteristics and radiation characteristics in the pressure suppression chamber of the primary containment vessel according to the first embodiment of the present invention in the case where the position of the lower end of the baffle plate is changed.

FIG. 5 illustrates a change in the heat accumulating characteristics and in the heat radiation characteristics when $h_1$ is arranged to be 2.7 m and $h_3$ is changed in the above-described conditions in an actual system in which the depth of water of the vent tube is 3.7 m. A continuous line shows the heat radiation characteristics, where symbol R represents the ratio of the characteristics in the case where no baffle plate is provided. FIG. 5 shows the change in the heat accumulating characteristics and the heat radiation characteristics with respect to those shown in the case where the baffle plate 10 is not provided. The high temperature region on both the inside and the outside portions of the baffle plate 10 extends downward over the outlet 20 of the vent tube 5 in proportion to the value $h_3$. Therefore, both the heat accumulating characteristics and the heat radiation characteristics are improved. Referring to the drawing, when $h_3/h_1 > 0.75$, the influence of the temperature reduction at the lower end of the baffle plate 10 deteriorates the effect of the enlargement of the region achieved by lengthening the baffle plate 10, causing the both characteristics to be deteriorated. However, the characteristics can be improved in comparison to the case in which the baffle plate 10 is not provided.

Figure 6:
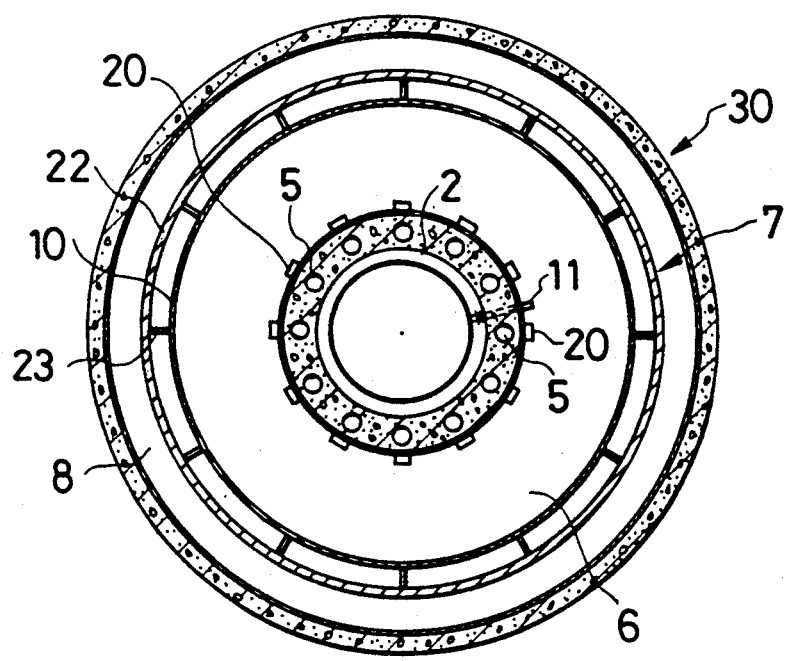
FIG. 6 is a horizontal cross sectional view taken along the height of the suppression chamber of the primary containment vessel according to a second embodiment of the present invention.

A second embodiment of the present invention is shown in FIG. 6. A plurality of the outlets 20 of the vent tube 5 are provided in the suppression pool 6. The supports 23 for supporting the baffle plate 10 in the suppression pool 6 are disposed at positions corresponding to the outlets 20 of the vent tube 5 in the circumferential direction, that is, are disposed on an extension in the radial direction of the outlet 20, the supports 23 establishing connections between the baffle plate 10 and the wall 22 of the primary containment vessel 7. The other portions are the same as those according to the first embodiment.

According to the second embodiment, noncondensing gas in the dry-well volume jets out from the outlet 20 of the vent tube 5 at the time of the accident so as to push water in the suppression pool 6 toward the baffle plate 10. Therefore, a large dynamic load generates in the circumferential portions corresponding to the outlets 20 of the vent tube 5, that is, in the direction of the horizontal extension of the outlets 20 of the vent tube 5. Since the baffle plate 10 is supported by the baffle plate 23 at the portion on which the large dynamic load acts, the required strength of the baffle plate 10 achieved by its thickness or the like can be reduced.

Figure 7:
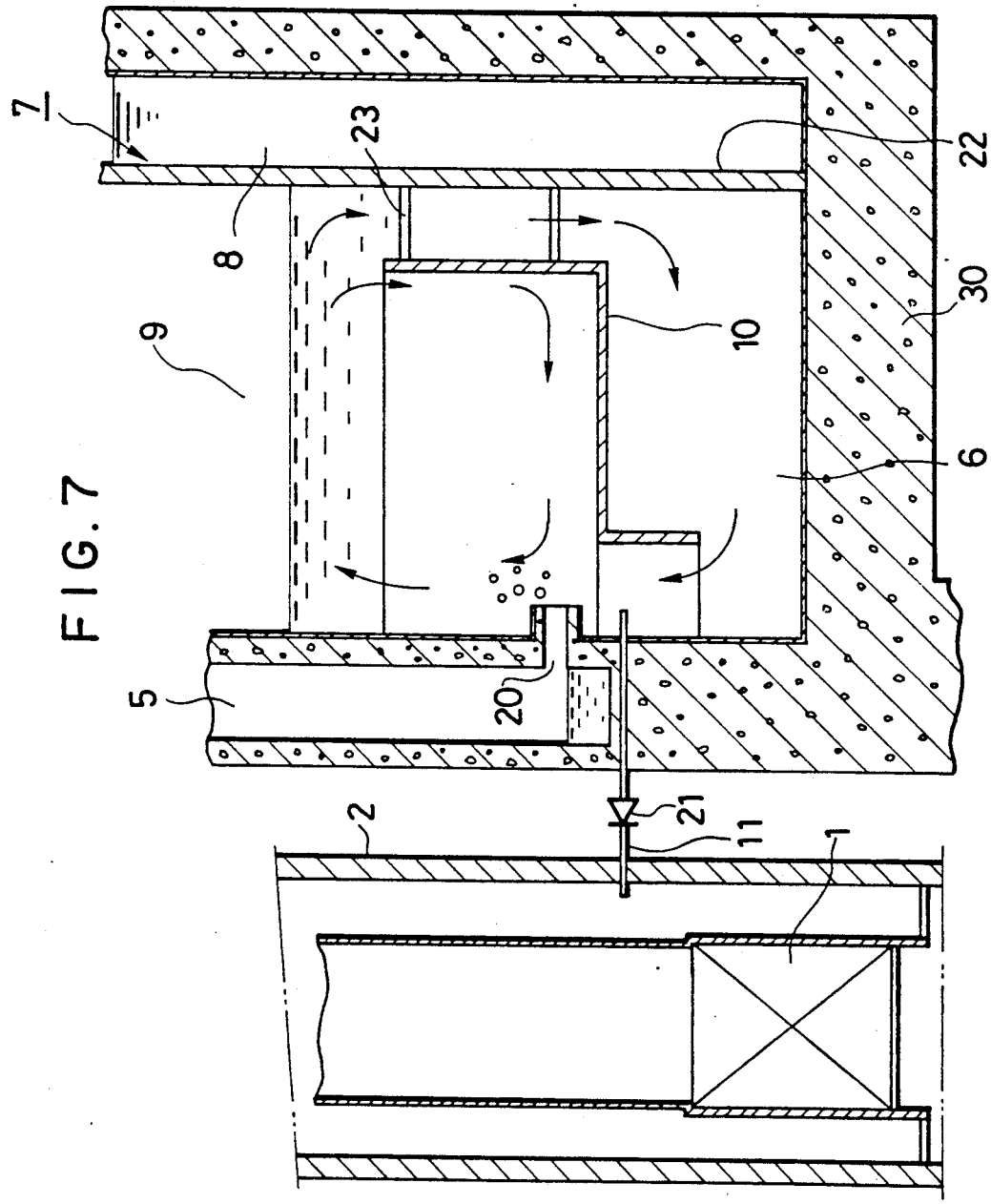
FIG. 7 is a vertical cross sectional view which illustrates the suppression chamber of the primary containment vessel according to a third embodiment of the present invention.

A third embodiment of the present invention is shown in FIG. 7. According to the third embodiment, the immersed portion of the vertical cross sectional shape of the baffle plate 10 in the suppression pool 6 is arranged to be in the form of a step. The baffle plate 10 is positioned close to the wall 22 of the primary containment vessel 7 in the portion upper than the height of the outlet 20 of the vent tube 5. The baffle plate 10 is positioned close to the inside wall of the suppression chamber 31 provided with outlet 20 of the vent tube 5 in the portion lower than the outlet 20 of the vent tube 5. The others are the same as those according to the first embodiment.

The influence of the dynamic load generated in the suppression pool 6 due to the noncondensing gas jetted out in the beginning of the accident must be considered in a portion above the outlet 20 of the vent tube 5 since the noncondensing gas has a buoyancy. According to the present invention, its structure is arranged such that the baffle plate 10 is positioned close to the outlet 20 in the region lower than the outlet 20 in which the effect of the dynamic load must not be considered. Therefore, such an arrangement does not cause any problem.

As described above, the baffle plate 10 is positioned close to the outlet 20 of the baffle plate 10 in the region lower than the height of the outlet 20 of the vent tube 5. As a result, hot water in the suppression pool 6 can be moved to a region adjacent to the bottom of the suppression pool 6 by the convection. Furthermore, since the convection can be induced horizontally, the overall water in the suppression pool 6 can be utilized as the heat accumulating pool including water in the bottom of the suppression pool 6. According to the model shown in FIGS. 3A and 3B, in respect to the temperature of water between the height of the outlet 20 and the lower end of the baffle plate 10, the temperature of water outside of the baffle plate 10 is higher than that inside of the same. Therefore, hot water region outside of the baffle plate 10 can be spread along the depth of water, causing the heat accumulating performance of the suppression pool 6 to be enhanced. Therefore, according to the third embodiment, the heat accumulating characteristics of the suppression chamber can be improved.

According to any of the embodiments of the present invention, the following effects can be obtained:

Since the water convection region in the suppression pool 6 can be downwards enlarged, the heat accumulating performance and the heat radiation performance of the suppression chamber 31 can be improved without the necessity of enlarging the suppression pool 6. Since the heat accumulating performance and the heat radiation performance of the suppression chamber 31 can be improved without the necessity of enlarging the suppression pool 6, the primary containment vessel 7 including the suppression chamber 31 can be reduced in size.

Furthermore, since the convection region of water in the suppression pool 6 can be vertically enlarged by virtue of the baffle plate 10, the water depth to the outlet 20 of the vent tube 5 can, for example, be reduced by about 40%. Therefore, the height of the ceiling of the suppression chamber 31 necessary to prevent the ceiling of the same from a damage can be reduced, the damage being due to pool swell taken place in the beginning of the accident, that is due to the standing up of the water surface caused by the noncondensing gas jetted out from the outlet 20 of the vent tube 5. Namely, the bottom of the dry-well volume in which the main stream line 3 is arranged can be lowered.

It the case where the equalizing line 11 is provided, the height of it can also be reduced in accordance with the structure in which the water depth to the outlet 20 of the vent tube 5 is reduced. Therefore, the top end of the core 1 can be raised. Since the position of the core 1 can be raised, the vertical size of the reactor pressure vessel 2 can be reduced.

As a result, the height of the reactor pressure vessel 2, that is the primary containment vessel 7 can be reduced.

Furthermore, since the water depth to the outlet 20 of the vent tube 5 can be reduced, the water head pressure acting to the outlet 20 of the vent tube 5 can be lowered, causing the pressure in the dry-well volume 4 at the time of the accident to be reduced. Therefore, the necessary strength of the primary containment vessel 7 can be reduced.

Although the invention has been described in its preferred form with a certain degree of particularly, it is understood that the present disclosure of the preferred from has been changed in the details of construction and the combination and arrangement of parts may be resorted to without departing from the spirit and the scope of the invention as hereinafter claimed.

What is claimed is:

1. A primary containment vessel comprising:
   a dry-well volume accommodating a reactor pressure vessel in which a core is accommodated and covering the upper portion of said reactor pressure vessel;
   an annular suppression chamber provided with a suppression pool surrounding an intermediate portion of said reactor pressure vessel and filled with cooling water, the water surface of which is positioned higher than the top end of said core:
   a plurality of vent tubes establishing a connection between said dry-well volume and said suppression pool;
   a steel containment vessel forming an annular outer wall of said suppression chamber and hermetically surrounding said dry-well volume:
   an outer pool surrounding the outer wall and filled with cooling water: and
   a baffle plate disposed in said suppression pool along said outer wall, having its top end positioned at a height between a free surface of said suppression pool and an outlet of said vent tube opened in said suppression pool and its lower end positioned at a height between said outlet and the bottom of said suppression pool, wherein a natural pool water convection passage circulating from the inside of said baffle plate to the outside of the same is formed.

2. A primary containment vessel according to claim 1, wherein said baffle plate is disposed in a region defined by $h_1 > h_3$ where the difference in height between said top end of said baffle plate and said outlet is $h_1$ and the difference in height between said outlet and said lower end of said baffle plate is $h_3$.

3. A primary containment vessel according to claim 1 further comprising an equalizing line for establishing a connection between said suppression pool and said reactor pressure vessel via a check valve thereof for stopping a flow into said suppression pool, said equalizing line having its opening in said suppression pool at a position lower than said outlet and its opening in said reactor pressure vessel at a position higher than said core.

4. A primary containment vessel according to claim 1, wherein said baffle plate is secured by a plurality of supports fastened to said outer wall.

5. A primary containment vessel according to claim 1, wherein said baffle plate is annularly formed along said outer wall.

6. A primary containment vessel according to claim 1, wherein said baffle plate has a vertical cross sectional shape formed in such a manner that it is positioned close to said outer wall in a portion upper than said outlet and it is positioned close to said outlet in a portion lower than said outlet.

7. A primary containment vessel comprising:
   a dry-well volume accommodating a reactor pressure vessel in which a core is accommodated and covering the upper portion of said reactor pressure vessel:
   an annular suppression chamber provided with a suppression pool surrounding an intermediate portion of said reactor pressure vessel and filled with cooling water, the water surface of which is positioned higher than the top end of said core:
   a plurality of vent tubes establishing a connection between said dry-well volume and said suppression pool:
   a steel containment vessel forming an annular outer wall of said suppression chamber and hermetically surrounding said dry-well volume;
   an outer pool surrounding the outer wall and filled with cooling water;
   an equalizing line for establishing a connection between said suppression pool and said reactor pressure vessel via a check valve thereof for stopping a flow into said suppression pool, said equalizing line having its opening in said suppression pool at a position lower than said outlet and its opening in said reactor pressure vessel at a position higher than said core: and
   an annular baffle plate disposed in said suppression pool along said outer wall by being secured by a plurality of supports fastened to said outer wall, having its top end positioned at a height between a free surface of said suppression pool and an outlet of said vent tube opened in said suppression pool and its lower end positioned at a height between said outlet and the bottom of said suppression pool, wherein said baffle plate is disposed in a region defined by $h_1 > h_3$ where the difference in height between said top end of said baffle plate and said outlet is $h_1$ and the difference in height between said outlet and said lower end of said baffle plate is $h_3$ so that a natural pool water convection passage circulating from the inside of said baffle plate to the outside of the same is formed.

8. A primary containment vessel comprising:
   a dry-well volume accommodating a reactor pressure vessel in which a core is accommodated and covering the upper portion of said reactor pressure vessel;
   an annular suppression chamber provided with a suppression pool surrounding an intermediate portion of said reactor pressure vessel and filled with cooling water, the water surface of which is positioned higher than the top end of said core;
   a plurality of vent tubes establishing a connection between said dry-well volume and said suppression pool:
   a steel containment vessel forming an annular outer wall of said suppression chamber and hermetically surrounding said dry-well volume;
   an outer pool surrounding the outer wall and filled with cooling water;
   an equalizing line for establishing a connection between said suppression pool and said reactor pressure vessel via a check valve thereof for stopping a flow into said suppression pool, said equalizing line having its opening in said suppression pool at a position lower than said outlet and its opening in said reactor pressure vessel at a position higher than said core; and
   an annular baffle plate disposed in said suppression pool along said outer wall by being secured by a plurality of supports fastened to said outer wall, having its top end positioned at a height between a free surface of said suppression pool and an outlet of said vent tube opened in said suppression pool and its lower end positioned at a height between said outlet and the bottom of said suppression pool, said baffle plate having a vertical cross sectional shape formed in such a manner that it is positioned close to said outer wall in a portion higher than said outlet and it is positioned close to said outlet in a portion lower than said outlet, wherein said baffle plate is disposed in a region defined by $h_1 > h_3$ where the difference in height between said top end of said baffle plate and said out let is $h_1$ and the difference in height between said outlet and said lower end of said baffle plate is $h_3$ so that a natural pool water convection passage circulating from the inside of said baffle plate to the outside of the same is formed.

9. A primary containment vessel comprising:

a dry-well volume accommodating a reactor pressure vessel in which a core is accommodated and covering the upper portion of said reactor pressure vessel;

an annular suppression chamber provided with a suppression pool surrounding an intermediate portion of said reactor pressure vessel and filled with cooling water, the water surface of which is positioned higher than the top end of said core;

a plurality of vent tubes establishing a connection between said dry-well volume and said suppression pool:

a steel containment vessel forming an annular outer wall of said suppression chamber and hermetically surrounding said dry-well volume:

an outer pool surrounding the outer wall and filled with cooling water;

an equalizing line for establishing a connection between said suppression pool and said reactor pressure vessel via a check valve thereof for stopping a flow into said suppression pool, said equalizing line having its opening in said suppression pool at a position lower than said outlet and its opening in said reactor pressure vessel at a position higher than said core: and an annular baffle plate disposed in said suppression pool along said outer wall by being secured by a plurality of supports fastened to said outer wall, having its top end positioned at a height between a free surface of said suppression pool and an outlet of said vent tube opened in said suppression pool and its lower end positioned at a height between said outlet and the bottom of said suppression pool, wherein said baffle plate is disposed at a position at which $h_3 = 0.75 h_1$ is satisfied where the difference in height between said top end of said baffle plate and said outlet is $h_1$ and the difference in height between said outlet and said lower end of said baffle plate is $h_3$ so that a natural pool water convection passage circulating from the inside of said baffle plate to the outside of the same is formed.

10. A primary containment vessel comprising:

a dry-well volume accommodating a reactor pressure vessel in which a core is accommodated and covering the upper portion of said reactor pressure vessel;

an annular suppression chamber provided with a suppression pool surrounding an intermediate portion of said reactor pressure vessel and filled with cooling water, the water surface of which is positioned higher than the top end of said core;

a plurality of vent tubes establishing a connection between said dry-well volume and said suppression pool;

a steel containment vessel forming an annular outer wall of said suppression chamber and hermetically surrounding said dry-well volume;

an outer pool surrounding the outer wall and filled with cooling water:

an equalizing line for establishing a connection between said suppression pool and said reactor pressure vessel via a check valve thereof for stopping a flow into said suppression pool, said equalizing line having its opening in said suppression pool at a position lower than said outlet and its opening in said reactor pressure vessel at a position higher than said core; and an annular baffle plate disposed in said suppression pool along said outer wall by being secured by a plurality of supports fastened to said outer wall, having its top end positioned at a height between a free surface of said suppression pool and an outlet of said vent tube opened in said suppression pool and its lower end positioned at a height between said outlet and the bottom of said suppression pool, said baffle plate having a vertical cross sectional shape formed in such a manner that it is positioned close to said outer wall in a portion higher than said outlet and it is positioned close to said outlet in a portion lower than said outlet, wherein said baffle plate is disposed at a position at which $h_3 = 0.75 h_1$ is satisfied where the difference in height between said top end of said baffle plate and said outlet is $h_1$ and the difference in height between said outlet and said lower end of said baffle plate is $h_3$ so that a natural pool water convection passage circulating from the inside of said baffle plate to the inside of the same is formed.

* * * * *